US012545481B2

(12) United States Patent
Davidson et al.

(10) Patent No.: US 12,545,481 B2
(45) Date of Patent: Feb. 10, 2026

(54) INTEGRATED CLOSURE AND CONTAINER

(71) Applicant: Jabil Inc., St. Petersburg, FL (US)

(72) Inventors: Ryan P. Davidson, St. Petersburg, FL (US); Jeffrey C. Minnette, St. Petersburg, FL (US)

(73) Assignee: Jabil Inc., St. Petersburg, FL (US)

( * ) Notice: Subject to any disclaimer, the term of this patent is extended or adjusted under 35 U.S.C. 154(b) by 197 days.

(21) Appl. No.: 17/639,120

(22) PCT Filed: Sep. 17, 2020

(86) PCT No.: PCT/US2020/051235
§ 371 (c)(1),
(2) Date: Feb. 28, 2022

(87) PCT Pub. No.: WO2021/055578
PCT Pub. Date: Mar. 25, 2021

(65) Prior Publication Data

US 2022/0274745 A1 Sep. 1, 2022

Related U.S. Application Data

(60) Provisional application No. 62/902,020, filed on Sep. 18, 2019.

(51) Int. Cl.
*B65D 47/08* (2006.01)
*B29D 99/00* (2010.01)
*B65D 47/36* (2006.01)

(52) U.S. Cl.
CPC ..... *B65D 47/0804* (2013.01); *B29D 99/0096* (2013.01); *B65D 47/36* (2013.01)

(58) Field of Classification Search
CPC ............... B65D 47/0804; B65D 47/36; B65D 2401/15; B65D 47/0847; B65D 85/72; B29D 99/0096

(Continued)

(56) References Cited

U.S. PATENT DOCUMENTS 3,604,585 A * 9/1971 Towns .................. B65D 55/02 215/235
3,703,975 A * 11/1972 Wittemer ................ G11C 11/40 220/212.5

(Continued)

FOREIGN PATENT DOCUMENTS

CH 675410 A5 * 9/1990 ......... B65D 2401/15
CH 683174 A5 * 1/1994 ......... B65D 47/0814

(Continued)

OTHER PUBLICATIONS

Office Action issued in corresponding Chinese Application No. 202080064057.1, dated Jul. 18, 2024.

*Primary Examiner* — Don M Anderson
*Assistant Examiner* — Eric C Baldrighi
(74) *Attorney, Agent, or Firm* — Young Basile Hanlon & MacFarlane, P.C.

(57) ABSTRACT

Disclosed herein are integrated closures for a container The integrated closure includes a base and a lid connected to the base via a hinge, where the lid and hinge are configured to permit the lid to open towards a center of the integrated closure, and a film. The film including a first portion connected to at least a portion of a bottom surface of the base, a second portion connected to at least a bottom surface of the lid, and a third portion connected to the first portion and releasably connected to the second portion. The integrated closure including a tamper indicator membrane connected to an edge of the lip and a corresponding edge of the base. The base further including a retention mechanism, the retention mechanism configured to engage and retain the lid in an open position.

15 Claims, 10 Drawing Sheets

(58) Field of Classification Search
USPC .......................................................... 215/235
See application file for complete search history.

(56) References Cited

U.S. PATENT DOCUMENTS 3,977,559 A * 8/1976 Lombardi ............ B65D 47/103 220/792
4,164,303 A * 8/1979 Waterbury ........... B65D 17/508 220/837
4,170,724 A * 10/1979 Waterbury ........... B65D 47/286 220/345.3
4,210,272 A * 7/1980 Sequin ................... B65D 47/10 229/404
4,244,488 A * 1/1981 Fridl .................... B65D 17/505 220/838
4,387,828 A * 6/1983 Yates, Jr. ........... B65D 43/0212 220/792
4,473,168 A * 9/1984 Cox ................... B65D 43/0222 220/258.2
4,513,876 A * 4/1985 Buchner ............ B65D 17/4012 220/270
4,595,123 A * 6/1986 Libit ...................... B65D 55/02 285/391
4,741,450 A * 5/1988 Braude .............. B65D 43/0268 220/269
4,886,206 A * 12/1989 Martinez ................ B65D 1/265 229/123.1
5,090,584 A 2/1992 Roberts et al.
5,603,421 A * 2/1997 Opresco ............... B65D 50/046 215/217
6,158,632 A * 12/2000 Ekkert ................. B65D 47/089 220/254.3
7,134,575 B2 * 11/2006 Vogel ................. B65D 21/0217 222/546
D568,155 S * 5/2008 Glydon .......................... D9/500
7,669,730 B2 * 3/2010 Lopez .................... A47G 19/22 220/592.17
7,740,730 B2 * 6/2010 Schedl .............. B29C 66/83411 220/359.3
9,132,947 B2 * 9/2015 Wiening ................... B32B 7/10
10,549,889 B2 * 2/2020 Giraud .................... B29C 39/00
2001/0050264 A1 12/2001 Schorner
2002/0014501 A1 * 2/2002 Nyman .................. B65D 35/44 222/153.07
2004/0013827 A1 * 1/2004 Zuser .................. B65D 77/206 428/34.1
2012/0012586 A1 1/2012 Rinderer et al.

FOREIGN PATENT DOCUMENTS

CN 101209763 A 7/2008
FR 2752818 A1 * 3/1998 ......... B65D 47/0814
JP H07291370 A 11/1995
JP 2012250727 A 12/2012
WO WO-2008030906 A2 * 3/2008 ......... B65D 47/0847
WO 2017100829 A1 6/2017

* cited by examiner

INTEGRATED CLOSURE AND CONTAINER

CROSS-REFERENCE TO RELATED APPLICATION(S)

This application is a national stage entry of International Patent Application Serial No. PCT/US2020/051235, filed Sep. 17, 2020, which claims priority to U.S. Provisional Application Ser. No. 62/902,020, filed Sep. 18, 2019, the entire disclosures of which are incorporated herein.

TECHNICAL FIELD

This disclosure relates to packaging and in particular, an integrated closure and container.

BACKGROUND

Containers, such as bottles, use liners and foils to seal and contain a material in the container. These sealing methods have multiple problems. The materials used in the foils are expensive relative to the cost of the container and the closure since the foils generally correspond to the size of the mouth of the container. In addition, placement and attachment of the foil adds complications to manufacturing. Access to the material in the container requires removal of the foil. The removed foils are not environmentally friendly as they are an additional disposable.

SUMMARY

Disclosed herein are integrated closures for a container. In an implementation, the integrated closure includes a base and a lid connected to the base via a hinge, where the lid and hinge are configured to permit the lid to open towards a center of the integrated closure, and a film. The film including a first portion connected to at least a portion of a bottom surface of the base, a second portion connected to at least a bottom surface of the lid, and a third portion connected to the first portion and releasably connected to the second portion. The integrated closure including a tamper indicator membrane connected to an edge of the lip and a corresponding edge of the base. The base and lid further including a bead facing the container, the bead engaging a ledge on the container to maintain the lid in a closed position with respect to the container. The base further including a retention mechanism, the retention mechanism configured to engage and retain the lid in an open position.

BRIEF DESCRIPTION OF THE DRAWINGS

The disclosure is best understood from the following detailed description when read in conjunction with the accompanying drawings and are incorporated into and thus constitute a part of this specification. It is emphasized that, according to common practice, the various features of the drawings are not to-scale. On the contrary, the dimensions of the various features are arbitrarily expanded or reduced for clarity.

DETAILED DESCRIPTION

Figure 1:
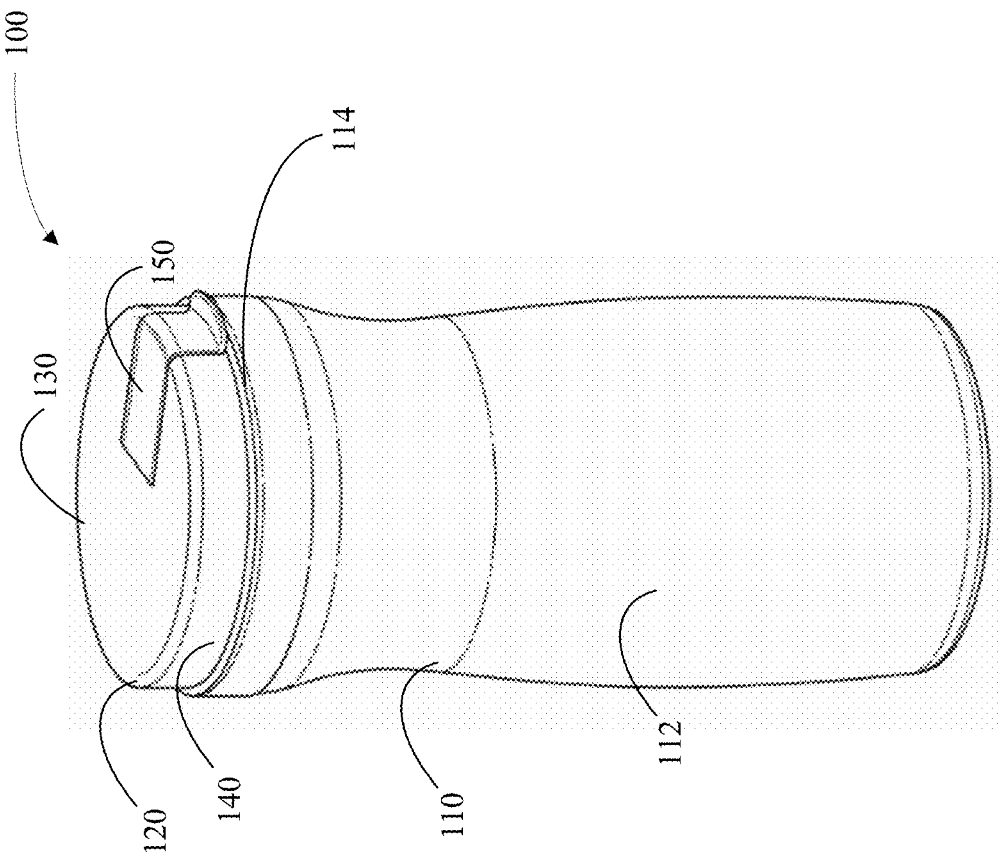
FIG. 1 is a diagram of an integrated closure and container in a closed position in accordance with some implementations.

The figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Embodiments and implementations are provided throughout so that this disclosure is sufficiently thorough and fully conveys the scope of the disclosed embodiments to those who are skilled in the art. Numerous specific details are set forth, such as examples of specific aspects, devices, and methods, to provide a thorough understanding of embodiments of the present disclosure. Nevertheless, it will be apparent to those skilled in the art that certain specific disclosed details need not be employed, and that embodiments may be embodied in different forms. As such, the exemplary embodiments set forth should not be construed to limit the scope of the disclosure.

The terminology used herein is for the purpose of describing particular embodiments only and is not intended to be limiting. For example, as used herein, the singular forms “a”, “an” and “the” may be intended to include the plural forms as well, unless the context clearly indicates otherwise. The terms “comprises,” “comprising,” “including,” and “having,” are inclusive and therefore specify the presence of stated features, steps, operations, elements, and/or components, but do not preclude the presence or addition of one or more other features, steps, operations, elements, components, and/or groups thereof.

The steps, processes, and operations described herein are thus not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

Yet further, although the terms first, second, third, etc. may be used herein to describe various elements, steps or aspects, these elements, steps or aspects should not be limited by these terms. These terms may be only used to distinguish one element or aspect from another. Thus, terms such as "first," "second," and other numerical terms when used herein do not imply a sequence or order unless clearly indicated by the context. Thus, a first element, step, component, region, layer or section discussed below could be termed a second element, step, component, region, layer or section without departing from the teachings of the disclosure.

The non-limiting embodiments described herein are with respect to integrated closures and containers. The integrated closures and containers and methods for making the integrated closures and containers may be modified for a variety of applications and uses while remaining within the spirit and scope of the claims. The embodiments and variations described herein, and/or shown in the drawings, are presented by way of example only and are not limiting as to the scope and spirit. The descriptions herein may be applicable to all embodiments of the device and the methods for making the devices.

Disclosed herein are implementations of integrated closures and containers. The implementations shown are illustrative and other implementations may include grips or protrusions for aiding in opening the integrated closure which are within the scope of the specification and claims described herein.

FIG. 1 is a view of an integrated closure and container 100 in a closed position in accordance with some implementations. The integrated closure and container 100 includes a container 110 and an integrated closure 120. The container 110 has a body 112 and a shoulder 114. The integrated closure 120 includes a base 130, a sidewall 140, and a lid 150. The height of the sidewall 140 is dimensioned to accommodate at least a neck (shown in FIG. 6 and FIG. 7) of the container 110. As described and shown in FIG. 6, FIG. 7, and FIG. 8, the width of the shoulder 114 of the container 110 is dimensioned to be bigger than the width of the integrated closure 120 as a tamper proof mechanism.

Figure 2:
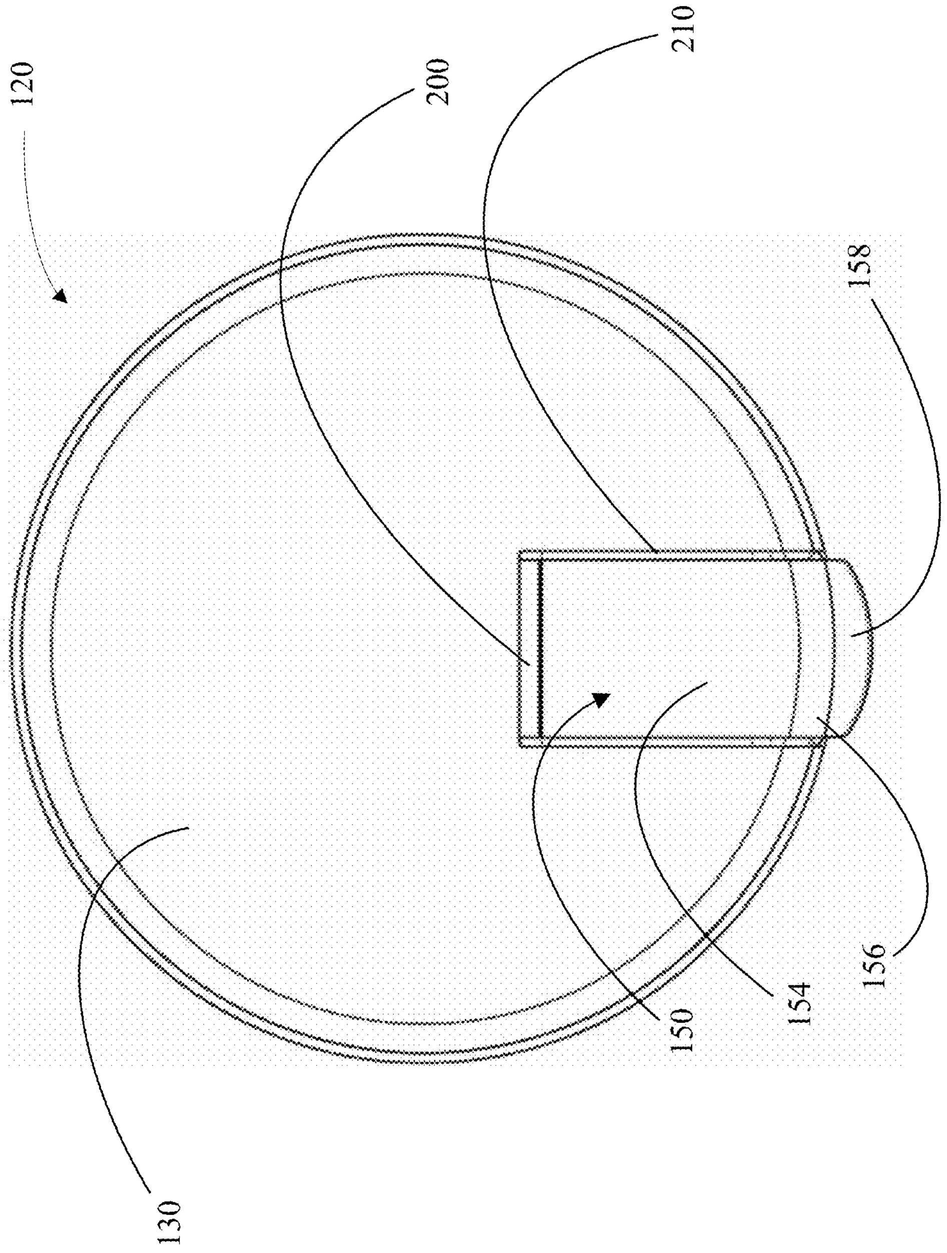
FIG. 2 is a top view of an integrated closure in accordance with some implementations.
Figure 3A:
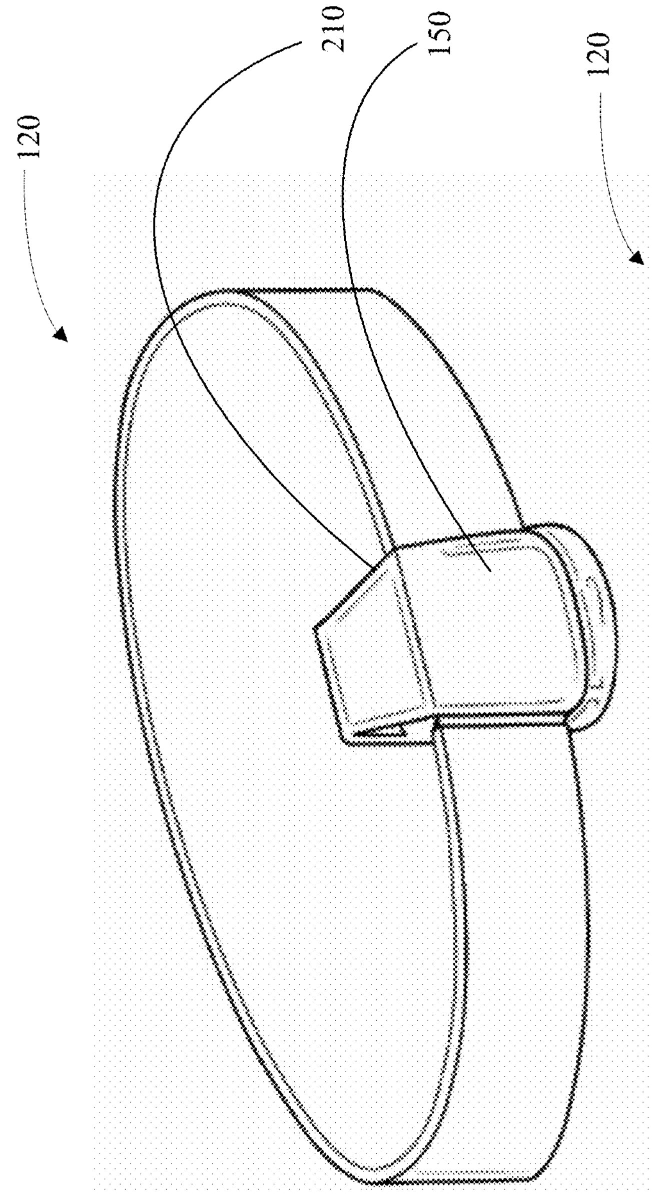
FIG. 3A is a perspective diagram an integrated closure in accordance with some implementations.

FIG. 2 is a top view and FIG. 3A is a perspective view of the integrated closure 120 of FIG. 1 in accordance with some implementations. The integrated closure 120 has a base 130, a lid 150, a hinge 200, and a tamper indication or evident membrane 210. The lid 150 includes a lid body 154 connected to a lid sidewall 156, which in turn is connected to a tab 158. The lid 150 is connected to the base 130 via the hinge 200 and the tamper indication membrane 210. The hinge 200 is a flexible membrane which allows the lid 150 move between an open position and a closed position as shown and described in FIG. 3B. The hinge 200 is located at an edge between the lid 150 and the base 130 such that the lid 150 opens toward a center of the integrated closure 120. The tamper indication membrane 210 is a molded membrane which provides evidence if the lid 150 has been previously open. The tamper indication membrane 210 is located at the edges between the lid 150 and the base 130 and the sidewall 140. The tamper indication membrane 210 is a membrane which tears when the tab 158 is pulled from a closed position to an open position as shown and described with respect to FIG. 3B. The base 130, the lid 150, the hinge 200, and the tamper indication membrane 210 may be made from a moldable material, where the tamper indication membrane 210 is made from moldable material which is thinner relative to the base 130, the lid 150, and the hinge 200. In an implementation, the moldable membrane may a plastic resin and the like.

Figure 3B:
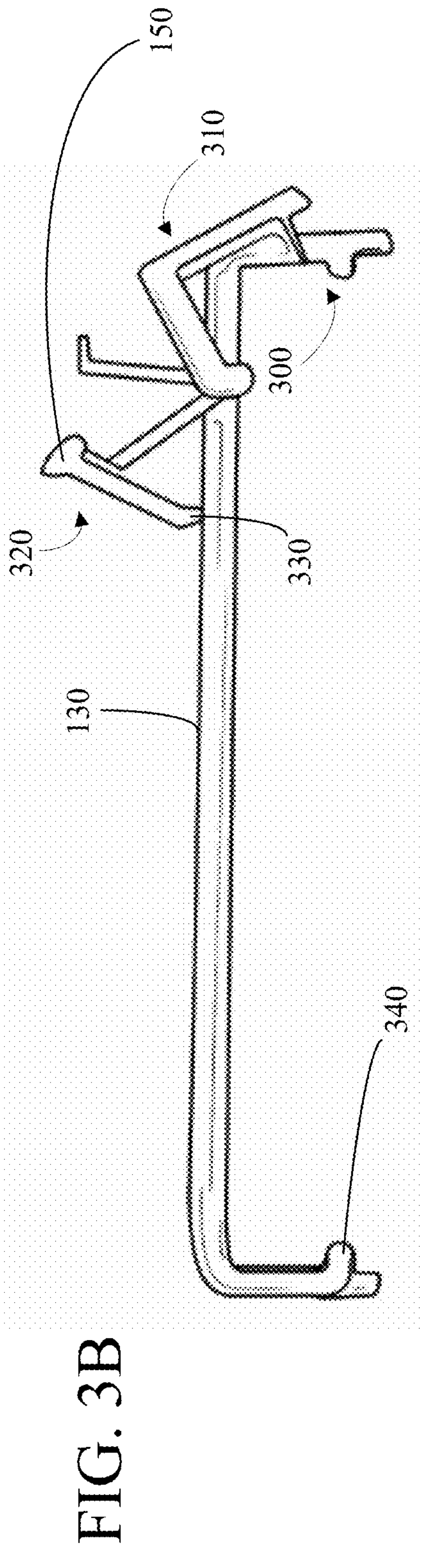
FIG. 3B is an integrated closure in action accordance with some implementations.

FIG. 3B shows the integrated closure 120 with the lid 150 in action accordance with some implementations. The hinge 200 of the lid 150 permits the lid 150 to be in a closed position 300, an intermediate position 310, and in an open position 320. In an implementation, the integrated closure 120 includes a retention mechanism 330 in the base 130 of the integrated closure 120 which maintains the lid 150 in the open position 320. The retention mechanism 330 may be an indentation or divot dimensioned to retain the tab 158 in the open position 320. In an implementation, the retention mechanism 330 may be a pressure or force fit mechanism. The integrated closure 120 includes a bead 340 on the lid sidewall 156 which runs along the circumference integrated closure 120. As shown and described with respect to FIG. 7 and FIG. 8, the bead 340 maintains the integrated closure 120 connected to the container 110 but permits the lid 150 to be opened and closed.

Figure 4:
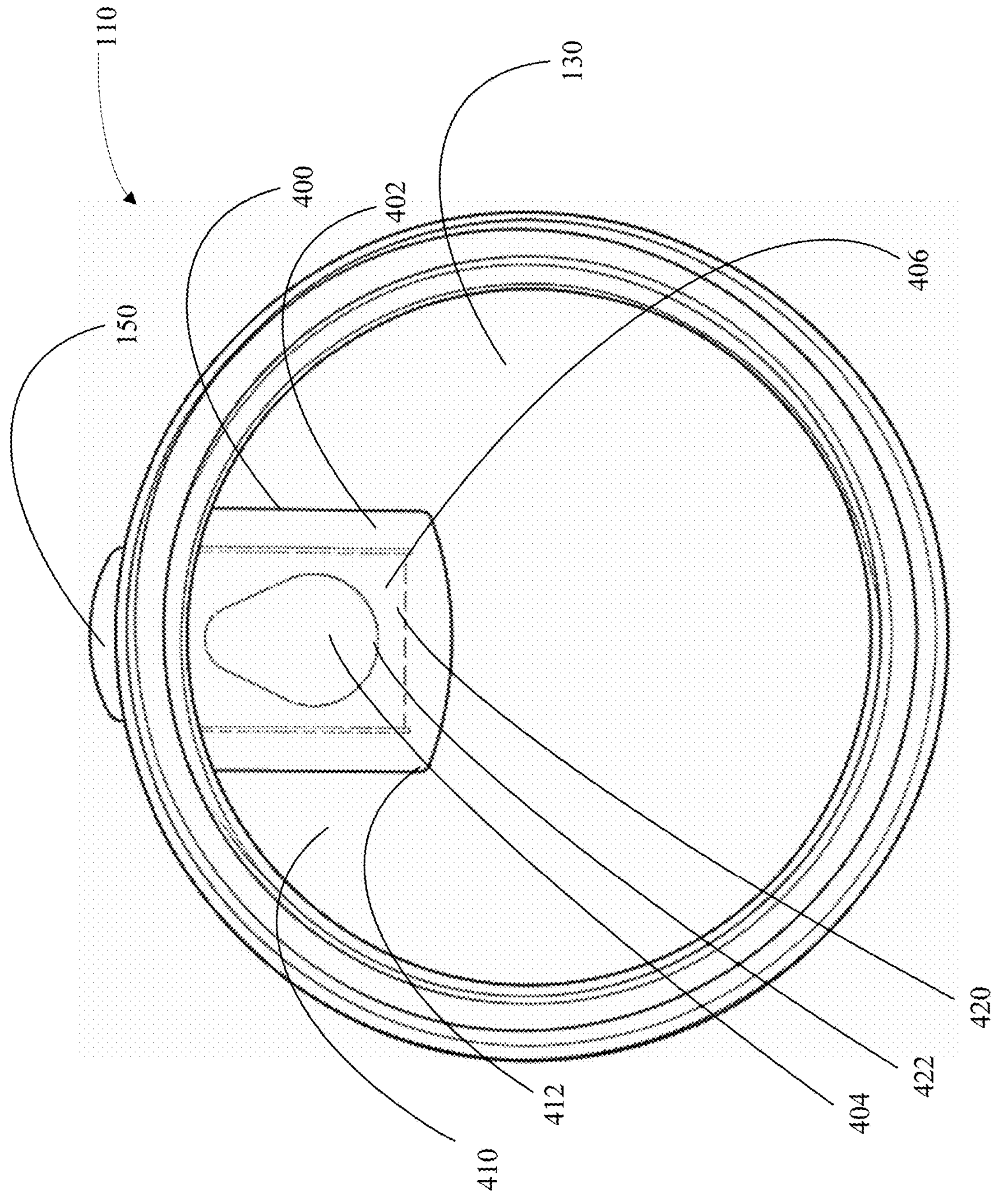
FIG. 4 is a bottom view of an integrated closure in accordance with some implementations.
Figure 5A:
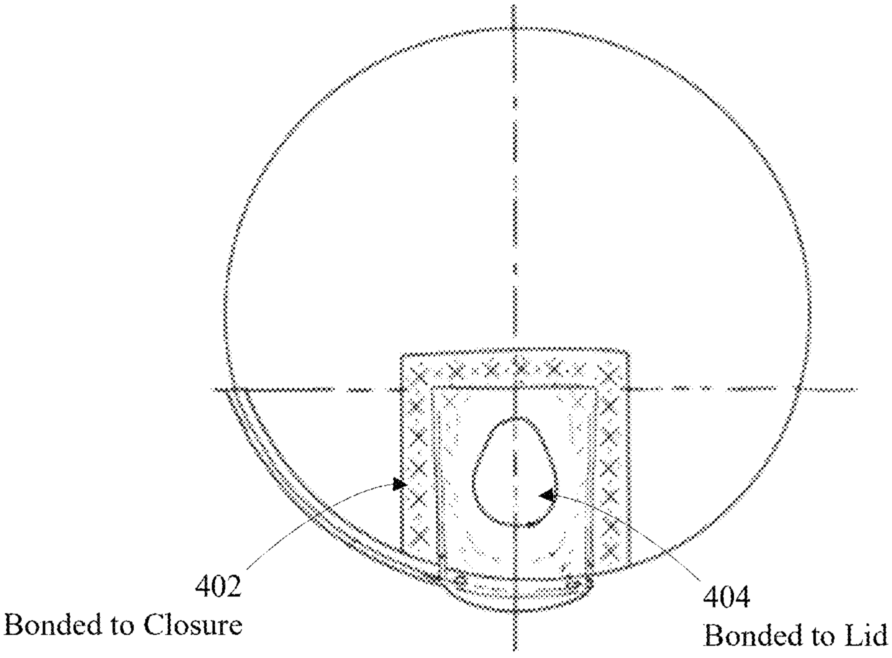
FIG. 5A is a bottom diagram of an integrated closure in accordance with some implementations.
Figure 5B:
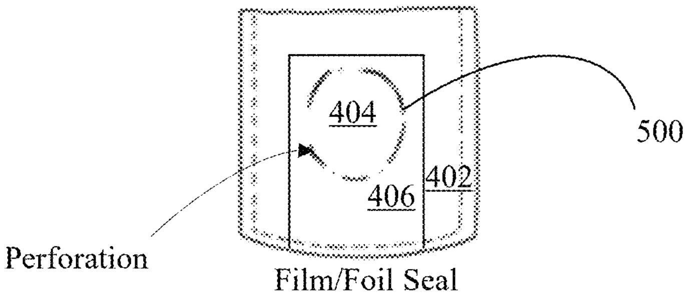
FIG. 5B is a partial bottom diagram of an integrated closure in accordance with some implementations.

FIG. 4 is a bottom view of the integrated closure 120 of FIG. 1 in accordance with some implementations. FIG. 5A is a bottom diagram of the integrated closure 120 of FIG. 1 in accordance with some implementations. FIG. 5B is a partial bottom diagram of the integrated closure 120 of FIG. 1 in accordance with some implementations. A film or the like (collectively "film") 400 is integrated on the bottom surfaces of the base 130 and the lid 150. In an implementation, the film 400 is a multilayer film. In an implementation, the film 400 is a bondable multilayer film. In an implementation, the film 400 is a heat and pressure treatable, bondable multilayer film. In an implementation, the film 400 is a multilayer plastic which is moldable and bondable to the base 130 and lid 150 as described herein.

Figure 7:
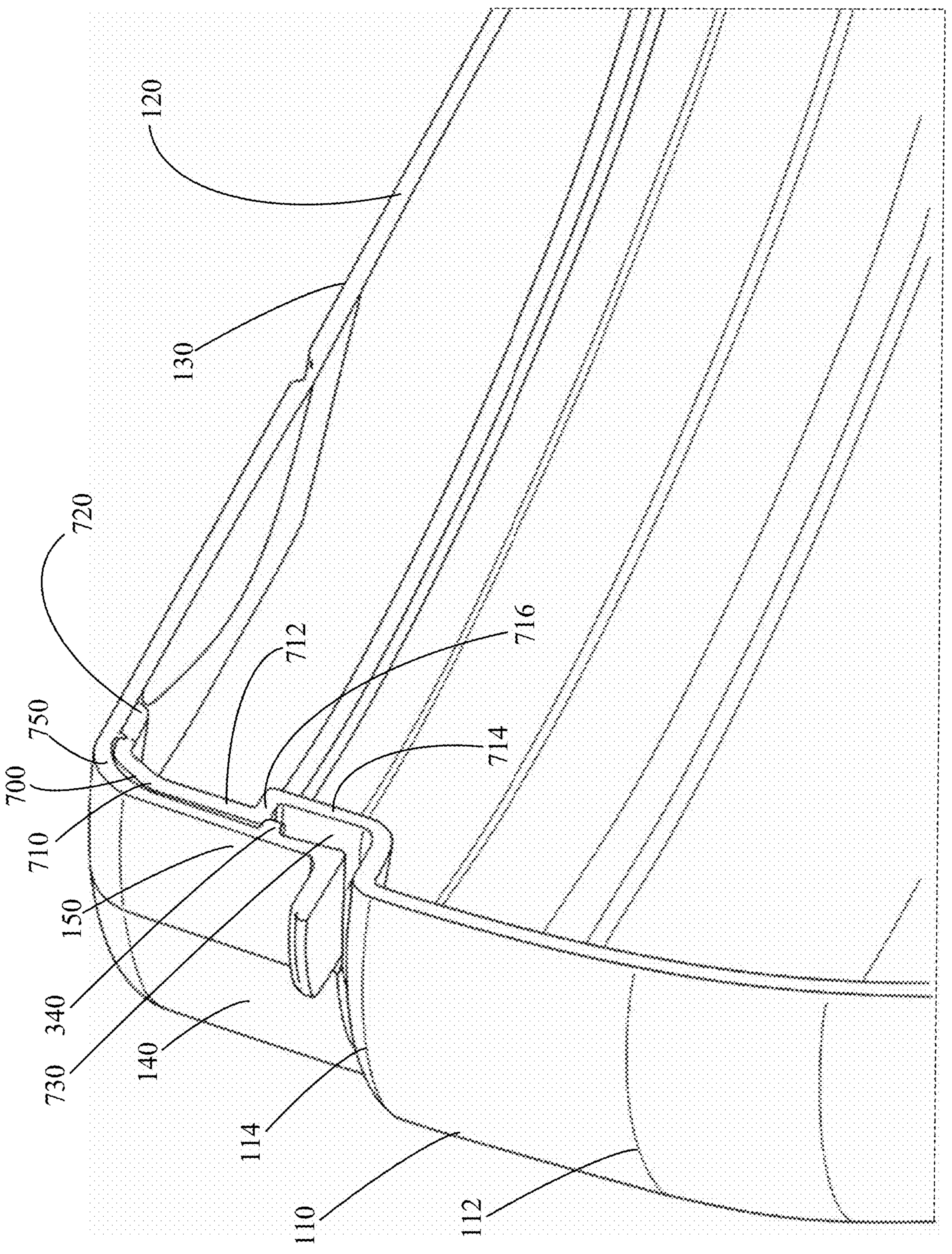
FIG. 7 is a cross-sectional view of an integrated closure and container in accordance with some implementations.

A first portion 402 of the film 400 is bonded to a corresponding portion 412 of a bottom surface 410 of the base 130 of the integrated closure 120. A second portion 404 of the film 400 is bonded to a corresponding portion 422 of a bottom surface 420 of the lid 150 of the integrated closure 110. The second portion 404 of the film 400 is in a perforated connection or relationship with a third portion 406 of the film 400 via a perforation line 500. As shown in FIG. 7, the film 400 is extended and molded or welded at an inner radius of the integrated closure 120. For example, the film 400 may extend to a curved section 750 or approximate thereof so that a portion of the film 400 may be in a sandwich position between the container 110 and the lid 150, and between the container 110 and the base 130 when the integrated closure is on the container. For example, the film 400 may extend to a portion of the sidewall 140. This may maintain the third portion 406 in a stretched and stiff position when the lid 150 is opened and the second portion 404 is separated from the third portion 406. In an implementation, although a perforation line 500 is described, other mechanisms may be used including a scribe line and the like.

Figure 6:
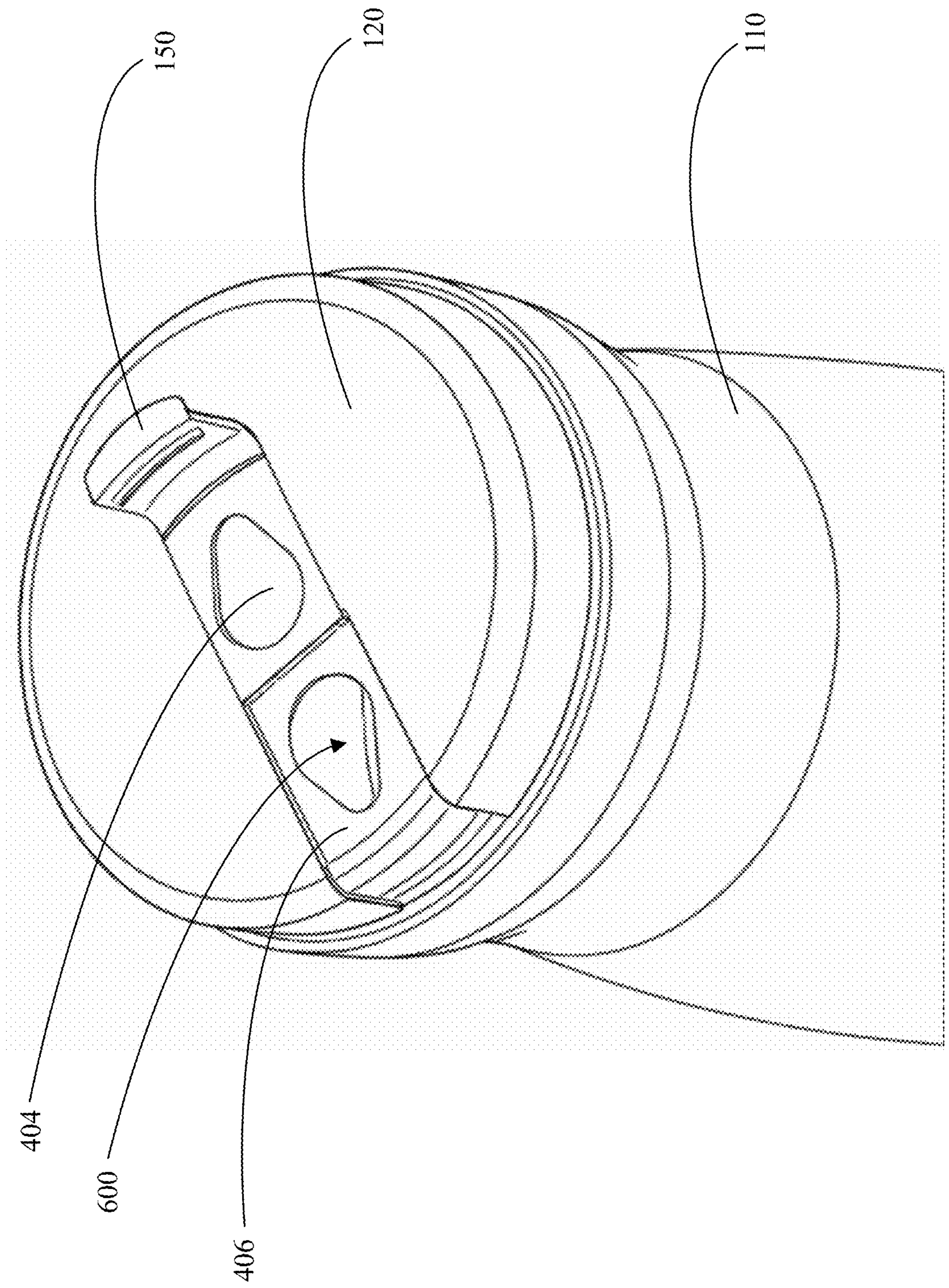
FIG. 6 is a view of an integrated closure and container in an open position in accordance with some implementations.

FIG. 6 is a view of the integrated closure 120 on the container 110 in an open position in accordance with some implementations. As shown, when the lid 150 is flipped open from the container 110, the second portion 404 of the film 400 remains bonded to the lid 150 creating an opening or hole 600 relative to the third portion 406 for dispensing material contained in the container 110. The first portion 402 remains bonded on the bottom surface 410 of the base 130, and the third portion 406 is suspended due to its connection to the first portion 402. Since the second portion 404 remains on the lid 150, waste is mitigated.

Figure 8:
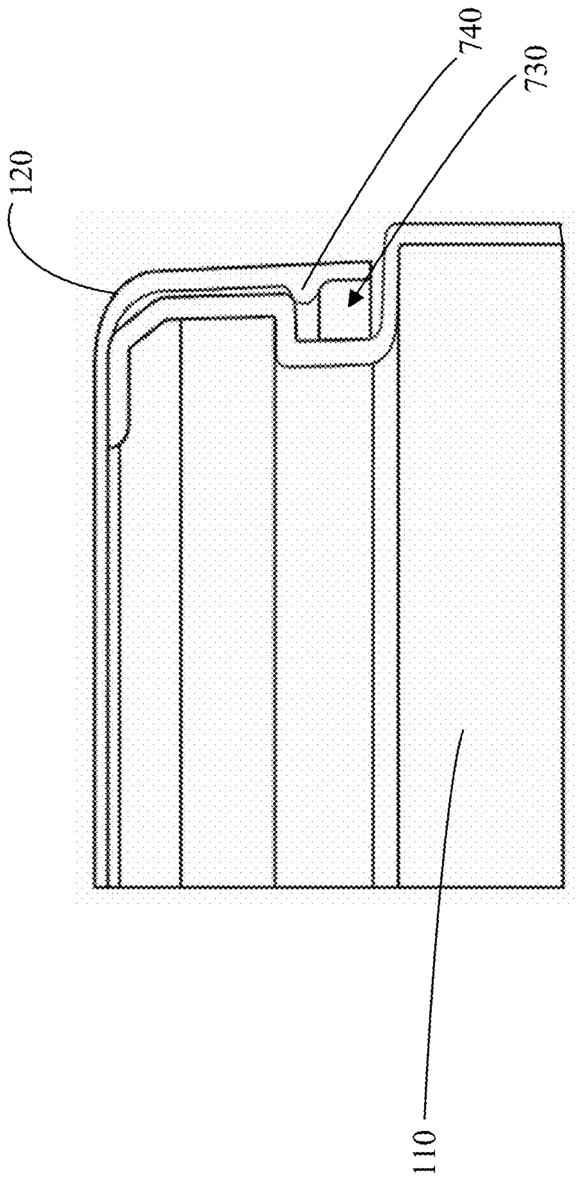
FIG. 8 is a cross-sectional view of an integrated closure and container in accordance with some implementations.

FIG. 7 is a cross-sectional view of the integrated closure and container 100 in accordance with some implementations and FIG. 8 is a cross-sectional view of an integrated closure and container 100 in accordance with some implementations. As described herein, the container 110 has a body 112, a shoulder 114, and a neck 700. The neck 700 includes a sidewall 710 and a top shoulder 720. The sidewall 710 has a first leg 712 which is offset from a second leg 714 by a length of a third leg 716, which is perpendicular to the first leg 712 and the second leg 714 and connects the first leg 712 and the second leg 714. The third leg 716 being a ledge. The offset configuration forms a groove 730. The neck 700 has a "S" shaped configuration.

The integrated closure 120 has a base 130, a sidewall 140, and a lid 150. The sidewall 140 and the lid 150 have a bead protrusion 340 which engages the third leg 716 and permits the sidewall 140 and the lid 150 to fit in the groove 730. The engagement results in an audible and tactile indicator to a consumer or user that the lid 150 is snapped close with respect to the container 100.

The shoulder 114 of the container 110 is wider than the width of the integrated closure 120. This allows the integrated closure 120 to sit tightly on the shoulder 114. Consequently, the integrated closure 120 is tamper proof in that the integrated closure 120 is hard to remove from the container 110.

Figure 9:
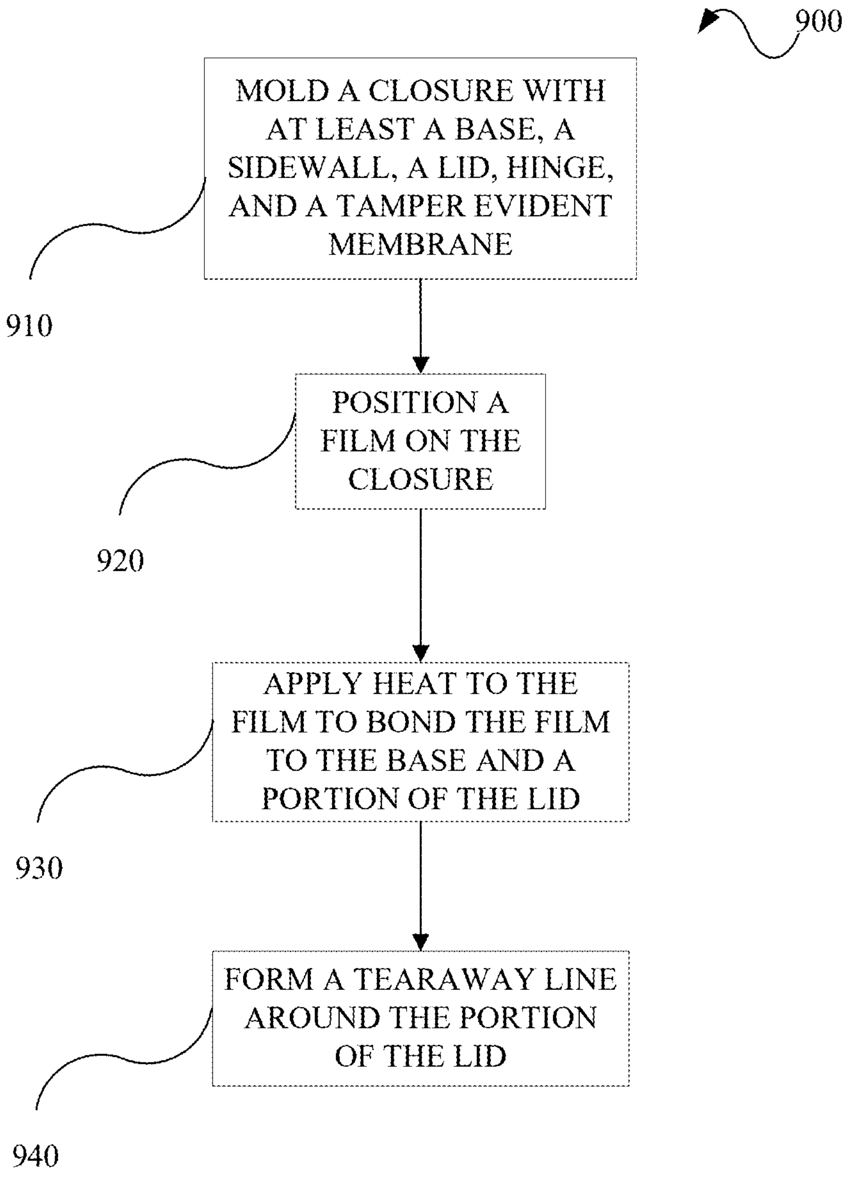
FIG. 9 is flowchart for manufacturing an integrated closure and container in accordance with some implementations.

FIG. 9 is flowchart of a method 900 for manufacturing an integrated closure and container in accordance with some implementations. The method 900 includes molding 910 a closure at least a base, a sidewall, a lid, hinge, and a tamper evident membrane; positioning 920 a film on the closure; applying 930 heat to the film to bond the film to the base and a portion of the lid; and forming 940 a tearaway line around the portion of the lid. The method 900 may be used to make the integrated closure and containers in FIGS. 1-8, for example.

The method 900 includes molding 910 a closure including at least a base, a sidewall, a lid, hinge, and a tamper evident membrane. The integrated closure may be molded in a closed position. The tamper evident membrane may have a thinner thickness relative to the lid and/or the base, for example. The tamper evident membrane is situated between the edges of the base and the sidewall proximate to the edges of the lid such that the lid opens towards a center of the closure. The hinge is a flexible structure between an edge the base and the lid which is flexible, movable, or rotatable between the closed position and an open position and such that the lid opens towards a center of the closure. The integrated closure and container described herein may be manufactured using compression molding, injection molding and other like production processes. The integrated closure and container may be made from polypropylene, high-density polyethylene, polyethylene terephthalate (PET), moldable plastic, and the like.

The method 900 includes positioning 920 a film on the closure. The film is positioned on edge portions of the base proximate the lid and the lid. The film extends toward and around an inner radius of the closure or on a portion of the sidewall.

The method 900 includes applying 930 heat to the film to bond the film to the base and to a portion of the lid. A heat pad or the like may heat the film to bond the film to the base and to the portion of the lid. In an implementation, heat and pressure may be used. In an implementation, the portion has a defined shape.

The method 900 includes forming 940 a tearaway line around the portion of the lid to complete formation of an integrated closure. The film is perforated or scribed along the portion so that when the lid is opened, the perforated portion remains on the lid and an opening for dispensing material in the container is formed.

Figure 10:
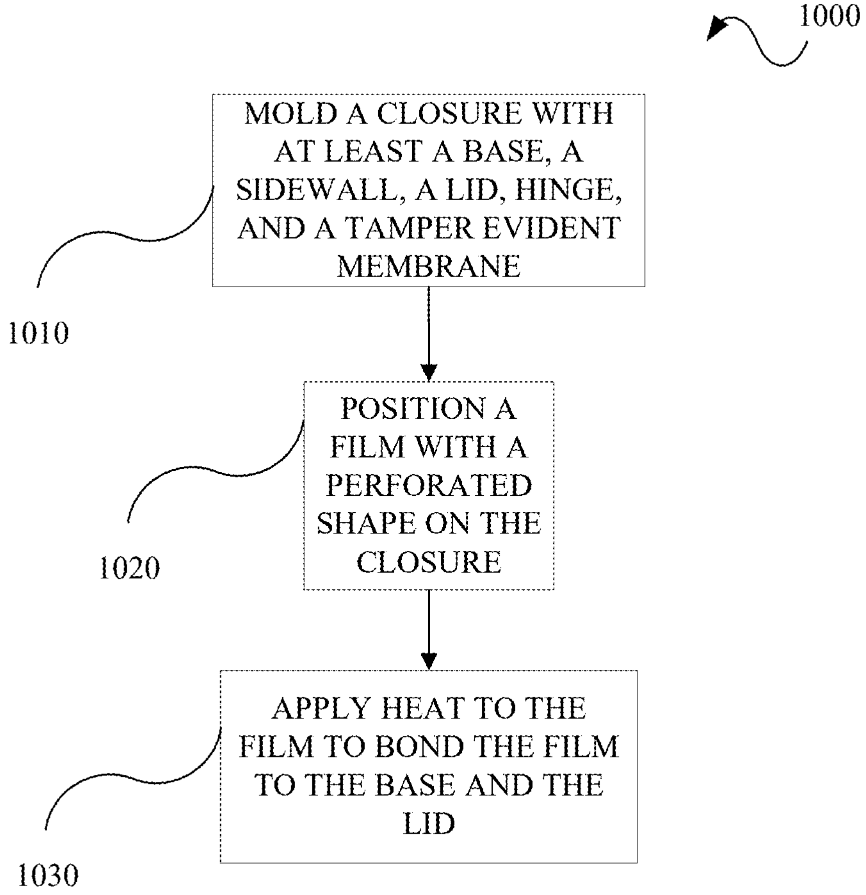
FIG. 10 is flowchart for manufacturing an integrated closure and container in accordance with some implementations.

FIG. 10 is flowchart of a method 1000 for manufacturing an integrated closure and container in accordance with some implementations. The method 1000 includes molding 1010 a closure at least a base, a sidewall, a lid, hinge, and a tamper evident membrane; positioning 1020 a film with a perforated shape on the closure; and applying 1030 heat to the film to bond the film to the base and the lid. The method 1000 may be used to make the integrated closure and containers in FIGS. 1-8, for example.

The method 1000 includes molding 1010 a closure including at least a base, a sidewall, a lid, hinge, and a tamper evident membrane. The integrated closure may be molded in a closed position. The tamper evident membrane may have a thinner thickness relative to the lid and/or the base, for example. The tamper evident membrane is situated between the edges of the base and the sidewall proximate to the edges of the lid such that the lid opens towards a center of the closure. The hinge is a flexible structure between an edge the base and the lid which is flexible, movable, or rotatable between the closed position and an open position and such that the lid opens towards a center of the closure. The integrated closure and container described herein may be manufactured using compression molding, injection molding and other like production processes. The integrated closure and container may be made from polypropylene, high-density polyethylene, polyethylene terephthalate (PET), moldable plastic, and the like.

The method 1000 includes positioning 1020 a film with a perforated shape on the closure. The film is positioned on edge portions of the base proximate the lid and the perforated shape is positioned on the lid. The film extends toward and around an inner radius of the closure or on a portion of the sidewall.

The method 1000 includes applying 1030 heat to the film to bond the film to the base and to the lid. A heat pad or the like may heat the film to bond the film to the base and to the lid. In an implementation, heat and pressure may be used. The film is bonded so that when the lid is opened, the perforated shape remains on the lid and an opening for dispensing material in the container is formed.

The construction and arrangement of the methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials and components, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure Likewise, software implementations could be accomplished with standard programming techniques with rule-based logic and other logic to accomplish the various connection steps, processing steps, comparison steps, and decision steps.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated closure for a container, the integrated closure comprising:

a base;

a sidewall connected to the base and configured to extend over a neck of the container, wherein a height of the sidewall is dimensioned to accommodate the neck of the container;

a lid connected to the base via a hinge, wherein the lid and hinge are configured to permit the lid to move to an open position towards a center of the integrated closure to define an opening of the lid, closure of the lid relative to the container is configured to provide an audible and tactile indication, and the lid includes:

a lid body;

a lid sidewall connected to the lid body; and a tab connected to the lid sidewall;

a tamper indicator membrane molded with the base and the lid and connected to an edge of the lid, a corresponding edge of the base, and a corresponding edge of the sidewall, wherein the tamper indicator membrane is a molded membrane configured to tear when the lid is moved to the open position, and wherein the tamper indicator membrane has a thickness that is thinner relative to the base, the lid, and the hinge; and a multilayer film in a sandwich position between the container and the lid and in a sandwich position between the container and the base, wherein the multilayer film extends to a portion of the sidewall, the multilayer film is molded or welded at an inner radius of the integrated closure, and the multilayer film is a heat and pressure treatable plastic, the multilayer film comprising:

a first portion connected to a portion of a bottom surface of the base;

a second portion connected to at least a bottom surface of the lid and configured to remain connected to the bottom surface of the lid when the lid is in the open position; and a third portion connected to the first portion and connected to the second portion by a perforation line located between the third portion and the second portion, wherein the third portion defines an opening of the multilayer film when the lid moves to the open position and the opening of the multilayer film is located within the opening of the lid such that the opening of the lid is bigger than the opening of the multilayer film, and wherein the third portion is maintained in a stretched and stiff position when the lid is opened and the second portion is separated from the third portion.

2. The integrated closure of claim 1, the lid comprising:

a bead configured to engage a ledge formed on the neck of the container to maintain the lid in a closed position with respect to the container, wherein the bead extends along an inner surface of the sidewall of the integrated closure and extends along an inner surface of the lid.

3. The integrated closure of claim 2, the base further comprising:

a retention mechanism that is a divot dimensioned to retain the tab of the lid when the lid is in the open position, the retention mechanism configured to engage and retain the lid in an open position with respect to the container via pressure or force fit.

4. The integrated closure of claim 1, wherein the portion of the bottom surface of the base is located proximate to the lid.

5. The integrated closure of claim 1, wherein the second portion is a tearaway portion that remains connected to the lid during opening of the lid.

6. The integrated closure of claim 5, wherein the third portion is in a suspended state relative to the container and the integrated closure when the lid is opened via connection to the first portion.

7. The integrated closure of claim 1, wherein:

the sidewall further comprises a curved section; and the multilayer film extends to the curved section such that in a closed position the multilayer film is positioned between the container and the base.

8. The integrated closure of claim 1, wherein the multilayer film is bonded to both the base and the lid.

9. The integrated closure of claim 1, wherein the sidewall includes an edge that is configured to sit on a shoulder of the container, the shoulder of the container extending perpendicular to the sidewall.

10. The integrated closure of claim 1, wherein the sidewall is configured to be offset from a surface of a body of the container toward the center of the integrated closure when the integrated closure is connected to the container.

11. An integrated closure and container, comprising:

a container that includes:

a body;

a shoulder that extends perpendicular to the body; and a neck that includes a top shoulder and a sidewall, wherein the sidewall is offset from a surface of the body of the container towards and connected to the surface of the body of the container via the shoulder of the container, and wherein the sidewall includes:

a first leg that extends perpendicular to the shoulder;

a second leg offset from the first leg and located in line with the first leg; and a third leg positioned perpendicular to the first leg and the second leg such that the third leg connects the first leg to the second leg, wherein the first leg, the second leg, and the third leg form a groove; and an integrated closure configured to connect to the container, wherein a width of the shoulder is bigger than a width of the integrated closure to form a tamper proof mechanism, and wherein the integrated closure includes:

a base;

a sidewall that extends perpendicular to the base and is dimensioned to accommodate the neck;

a curved section that connects the base to the sidewall;

a lid connected to the base, wherein the lid is configured to be opened toward a center of the integrated closure, the lid extends along and connects to a radius of the top shoulder and the first leg of the sidewall, and the lid includes:

a lid body;

a lid sidewall connected to the lid body;

a tab connected to the lid sidewall, wherein the base includes a retention mechanism that is an indentation dimensioned to retain the tab via pressure or force fit; and a bead located on the sidewall configured to fit in the groove and engage the third leg to maintain the lid in a snap closed position with respect to the container to provide an audible and tactile indicator that the lid is snapped close with respect to the container; and a film that includes:

a first portion connected to a portion of a bottom surface of the base and positioned on edge portions of the base proximate to the lid, wherein the film extends toward and around an inner radius of the integrated closure;

a second portion connected to a bottom surface of the lid; and a third portion connected to the first portion and connected to the second portion by a perforation or scribe line such that the third portion is located in a suspended state relative to the container and the integrated closure when the lid is opened, wherein the third portion is maintained in a stretched and stiff position when the lid is opened and the second portion is separated from the third portion.

12. The integrated closure and container of claim 11, wherein the integrated closure further includes:

a tamper evident membrane connected to an edge of the lid and a corresponding edge of the base, wherein the tamper evident membrane, the lid, and the base are formed from a moldable material.

13. The integrated closure and container of claim 11, wherein the third portion is separate the integrated closure.

14. The integrated closure and container of claim 11, wherein:

the film extends to the curved section such that the film is sandwiched between the container and the lid; and the film extends to the curved section such that the film is sandwiched between the container and the base.

15. The integrated closure and container of claim 11, wherein the film is bonded to both the base and the lid.

* * * * *